Aug. 19, 1941.　　C. BALDENHOFER　　2,252,877

WAY GRINDING MACHINE

Filed Oct. 13, 1939　　8 Sheets-Sheet 1

Fig. 1.

INVENTOR
CHRISTIAN BALDENHOFER
BY
ATTORNEYS

Aug. 19, 1941.                C. BALDENHOFER                    2,252,877
                              WAY GRINDING MACHINE
                              Filed Oct. 13, 1939          8 Sheets-Sheet 2

Fig. 2.

Inventor
CHRISTIAN BALDENHOFER

Aug. 19, 1941.   C. BALDENHOFER   2,252,877
WAY GRINDING MACHINE
Filed Oct. 13, 1939   8 Sheets-Sheet 4

Inventor
CHRISTIAN BALDENHOFER
By Toulmin & Toulmin
Attorneys

Aug. 19, 1941.  C. BALDENHOFER  2,252,877
WAY GRINDING MACHINE
Filed Oct. 13, 1939  8 Sheets-Sheet 5

Inventor
CHRISTIAN BALDENHOFER
By Koulmin & Koulmin
Attorneys

Aug. 19, 1941.  C. BALDENHOFER  2,252,877
WAY GRINDING MACHINE
Filed Oct. 13, 1939  8 Sheets-Sheet 6

Inventor
CHRISTIAN BALDENHOFER
By Toulmin & Toulmin
Attorneys

Fig. 11.

Aug. 19, 1941.                C. BALDENHOFER                2,252,877
                              WAY GRINDING MACHINE
                              Filed Oct. 13, 1939            8 Sheets-Sheet 8

Inventor
CHRISTIAN BALDENHOFER
By Toulmin & Toulmin
Attorneys

Patented Aug. 19, 1941

2,252,877

UNITED STATES PATENT OFFICE 2,252,877

WAY GRINDING MACHINE

Christian Baldenhofer, Springfield, Ohio, assignor to The Thompson Grinder Company, Springfield, Ohio, a corporation of Ohio Application October 13, 1939, Serial No. 299,352

6 Claims. (Cl. 51—92)

This invention relates to grinding machines and more particularly to a multi-way grinding machine.

It is an object of this invention to provide a surface grinding machine for simultaneously grinding a plurality of surfaces on one or more work pieces disposed on a common table or support.

Another object is to provide an improved surface grinding machine which comprises multiple grinding mechanism arranged to straddle the work and whereby the grinding mechanism can be controlled from a central position.

Another object is to provide a multi-way grinding machine comprising laterally spaced grinding wheels which are supported by an overhead bridge structure and designed so that each of the grinding wheel means can be shifted independently vertically and laterally to the same or different working positions.

Another object is to devise a grinding machine equipped with grinding wheel members which are both manually and hydraulically operable for varying their vertical and lateral movements.

Another object is to devise a grinding machine comprising spaced grinding wheels and reciprocable work table wherein said grinding wheels are supported by an overhead interconnecting structure so as to provide a unitary grinding machine operable to simultaneously grind multiple work piece surfaces.

Another object is to devise a unitary multiple grinding machine whereby two or more working part surfaces may be ground simultaneously by independently controlled grinding wheel mechanism.

Another object is to provide a machine for straddle grinding with the use of multiple grinding wheel means which are equipped for lateral and vertical adjustment and operable either manually or hydraulically.

Another object is to devise a duo-surface grinding machine comprising two complementary grinding wheel means which are interconnected by unitary frame structure and arranged to be operated as a multi-way surfacing mechanism.

Another object is to provide a multi-way grinding mechanism having multiple grinding wheel means which can be adjustably positioned above the work by manually or electrically operated means.

General disclosure

Figure 1:
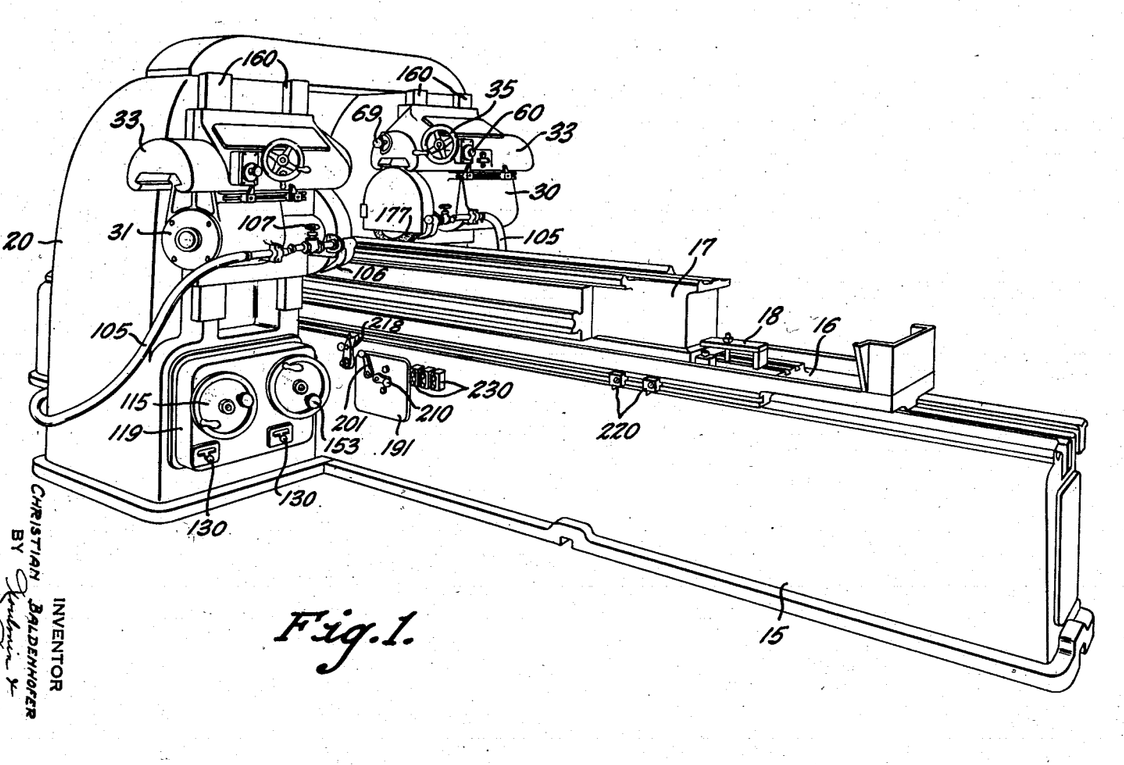
Figure 1 is a perspective view of the way grinding machine of this invention.
Figure 2:
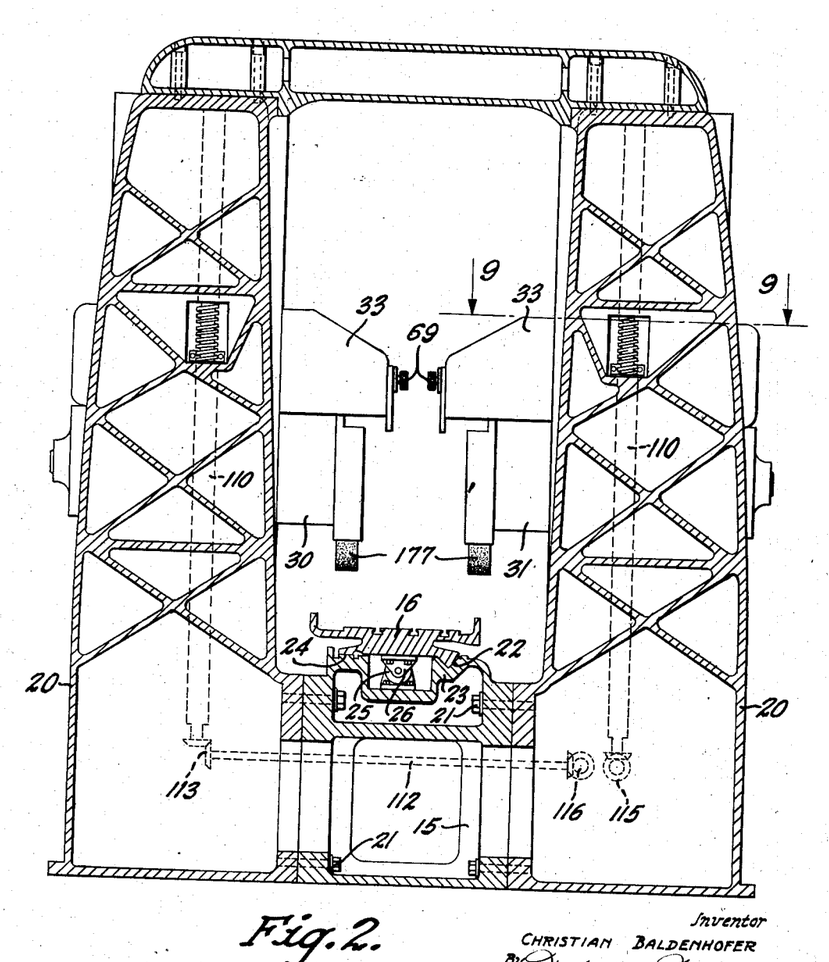
Figure 2 is a vertical sectional view through the machine showing the unitary frame construction and arrangement of the grinding wheel head mechanism and work table members; detail associated parts being omitted in the interest of clearness.

Referring to the drawings in detail, in Figures 1 and 2 there is shown a way grinding machine constructed according to my invention, comprising a stationary base or bed 15 which is preferably mounted level upon a solid floor or structural support during operation of the machine. The base 15 supports a reciprocable table 16 arranged to fixedly support the work piece means 17 which is to be ground. The work piece may be suitably fastened to the table, as shown at 18. The grinding wheel mechanism is supported by frame structure generally designated 20 which straddles the work table 16, as illustrated in Figure 2. The frame structure 20 is suitably secured, as by bolts 21 as illustrated in Figure 2, to the table supporting base 15.

The work feed table 16 is shaped to engage on its under-surface in the V-shaped longitudinal slot 22 which is formed on the top portion 23 of the base member 15. The opposite side of the table is shaped to provide a flat surface engagement with the top surface of the bed portion 23, as at 24. For reciprocating the work table 16 there is provided a hydraulically operated piston and cylinder means 25 which is bolted to the base portion 23 beneath the table. The piston is operably connected at its outer end to the bracket 26 which in turn is fastened to the undercarriage part of the feed table and is adapted to reciprocate the feed table 16 carrying the work piece 17 back and forth beneath the grinding wheel head members generally designated 30 and 31. The grinding wheel head members and associated mechanism are laterally reciprocable independently in the saddle supports generally designated 33 which comprise the depending groove guide portions 34 which slidably support the grinding wheel head mechanism.

*Grinding wheel head cross-feed operating mechanism*

Figure 3:
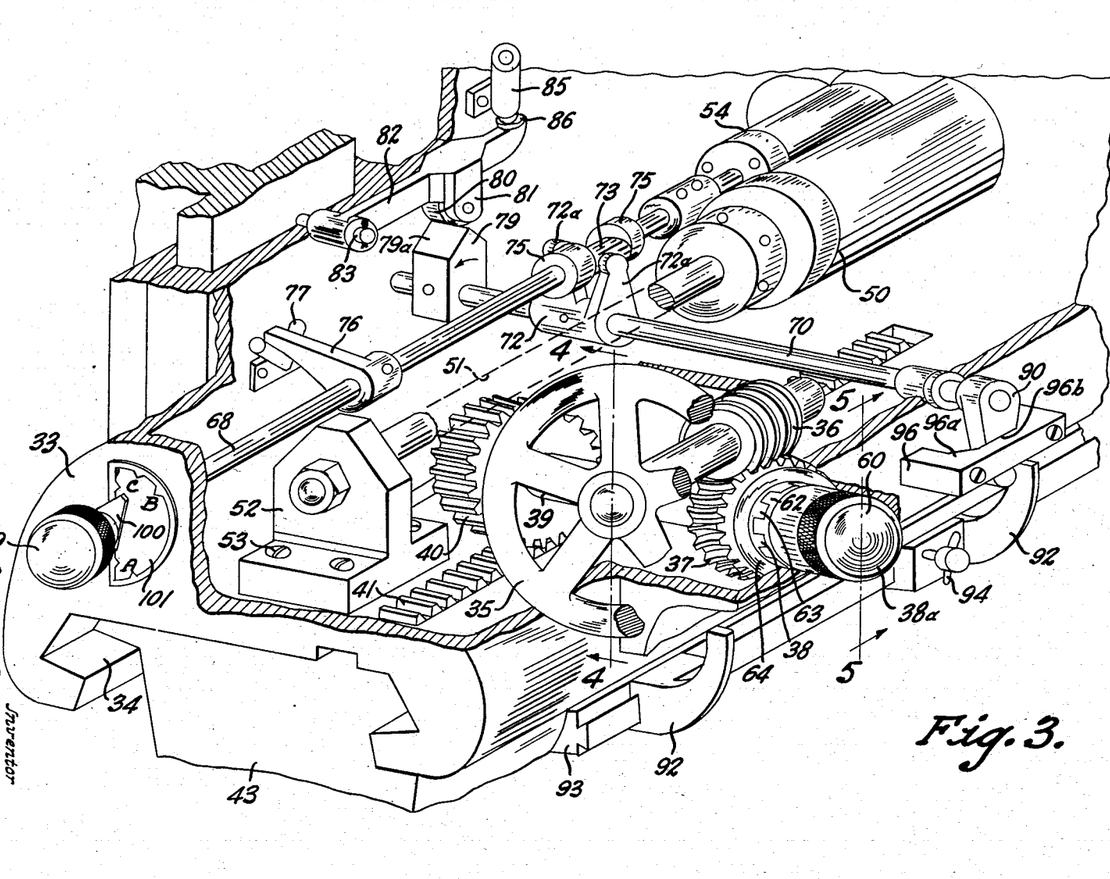
Figure 3 is a perspective view of the combined manual and hydraulic mechanism for reciprocating the grinding wheel head member crosswise of the machine, parts of the machine being broken away to show the arrangement of the parts more clearly.
Figure 4:
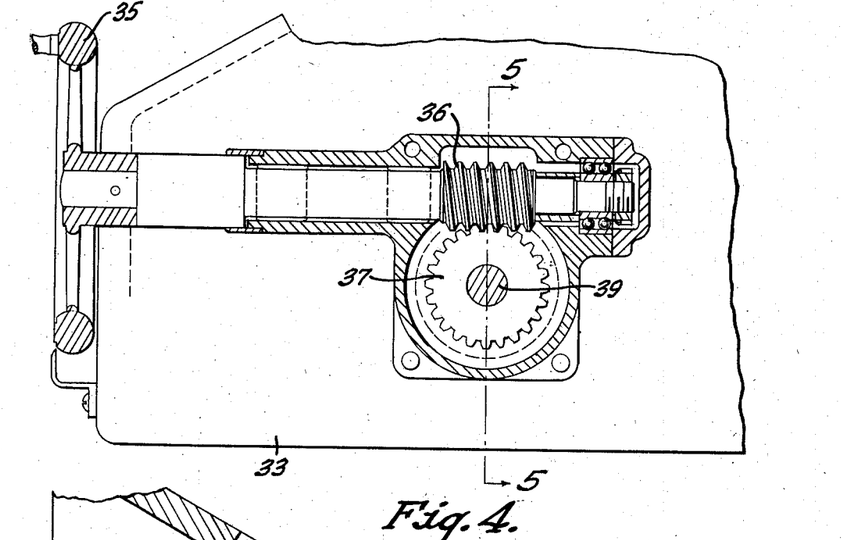
Figure 4 is a fragmentary detail sectional view taken on the line 4—4 of Figure 5 which is further indicated at line 4—4 on Figure 3, showing the mechanism for reciprocating the grinding wheel members crosswise of the machine.
Figure 5:
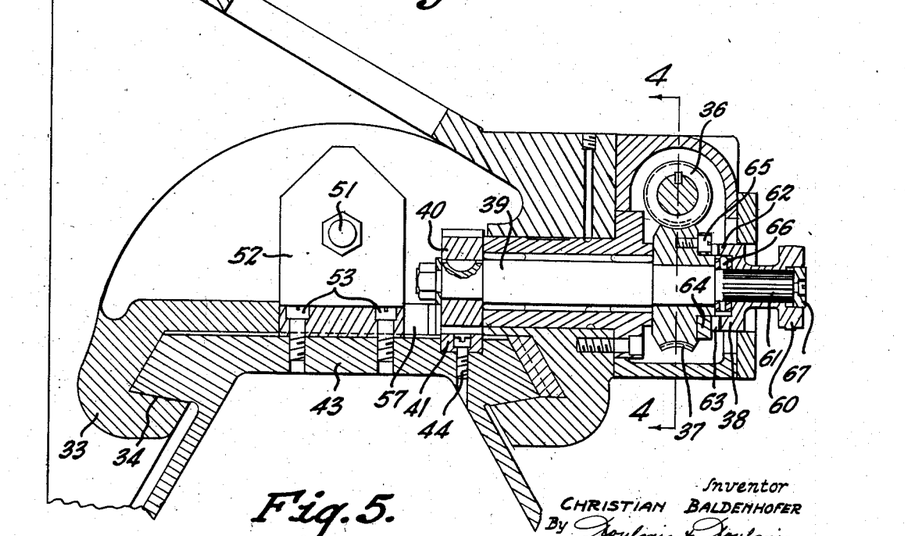
Figure 5 is a similar fragmentary detail sectional view taken on the line 5—5 of Figure 4 which is further indicated at line 5—5 on Figure 3, showing the clutch mechanism through which the manual and hydraulic actuated means is connected to the cross-feed grinding wheel mechanism.

Referring to Figures 3, 4 and 5 the hand wheel 35 is operable manually to move the grinding wheel mechanism laterally with respect to the work table 16. The cross feed means comprises the worm 36, worm gear 37, clutch 38, shaft 39 and spur gear 40. Spur gear 40 is keyed to the shaft 39 and is adapted to engage the rack 41 which is suitably fixed, as by machine screws 44, to the grinding wheel head member generally designated 43. Rotation of the shaft 39 results in movement of the grinding wheel head member 43 crosswise of the work table 16. For automatic operation a hydraulic cylinder and piston member generally designated 50 is employed. The piston rod member 51 is operatively connected to a T-shaped bracket 52 which is secured to the grinding wheel head member 43 by means of the machine screws 53. Valve chamber 54 houses the valve mechanism for controlling the flow of fluid to and from the cylinder 50. The valve mechanism comprises a piston 55 which is slidable in the bore 56 of the cylinder 54. A longitudinal opening 57 is provided in the stationary saddle member 33 for accommodating the movement of the bracket 52 and rack 41 relative thereto, as shown in Figure 5.

The clutch 38 comprises a knurled cylindrical projecting sleeve member 60 which is slidable axially on the outer end of the shaft 39 and engages the splines 61 on the outer end of shaft 39. The inner end of the clutch member 38 is equipped with teeth 62 which mesh with the opposed teeth 63 formed on the ring 64. This ring member is suitably fastened to the worm gear 37 by means of the machine screws 65. The worm gear 37 is loosely mounted on a reduced portion of the shaft 39 and is prevented from moving outward axially by the collar and pin means generally designated 66. A cap 67 is provided on the outer end of the shaft 39 to retain the clutch means 38 on the shaft 39.

When the clutch 38 is engaged, by grasping the knob 38a and moving it inward, the grinding wheel mechanism is locked against operation by the hydraulically actuated piston means 50. Valve rod 68, as shown in Figure 3, is connected to the piston valve 55 which is reciprocable in cylinder 54 so as to change the valve setting and control the reciprocation of the piston rod means 51, when the grinding wheel head members are manipulated by the hydraulic actuating mechanism. The outer end of the valve rod 68 is equipped with a knurled knob 69 for manually operating the valve 55. Reversing valve lever 70 extends transversely of the valve rod 68 and has fixedly mounted thereon the pushing fork member 72. Valve rod 68 is adapted to lie in the fork 72 and be reciprocated axially by the forks 72a which are positioned to engage the cam means 73 mounted on the valve rod member 68 to reciprocate the reversing valve 70 longitudinally when the valve rod 68 is rotated. Rotation of the valve rod 68 brings the cam 73 in engagement with either one of the fork members 72a sliding the reversing lever 70 axially.

To move the valve rod 68 axially there are provided the opposed collars 75 on the valve rod 68 which are suitably secured thereto at either end of the cam 73. Suitably fixed on the valve rod 68 is a finger member 76 which is arranged to rest in the V-shaped stop member 77 when the hydraulic actuating means for reciprocating the grinding wheel head members is to be set in neutral or hand feed position, as shown in Figure 3. The reversing rod 70 is loosely mounted at its ends in the side walls of the stationary saddle member 33 and the rod is adapted to be rotated as well as moved axially. Spaced from the inner end and fixed on the reversing lever 70 is a wedge shaped cam member 79 having diametrically oppositely inclined cam surfaces 79a which are adapted to be engaged by the roller 80 mounted on the end of the depending arm 81 intermediate the ends of the pivoted lever 82. The lever 82 pivots about the pin 83 and a compression spring means 85 engages the opposite end of the lever 82, as at 86, and urges the lever to swing downward about the pivot pin 83 forcing the roller 80 in contact with the cam 79. This arrangement prevents the valve rod 68 from coming to rest in a neutral position and provides a quick positive acting valve reversing lever action.

For actuating the valve 70 to reverse the direction of movement of the grinding wheel, a crank arm member 90 is secured to the outer end of the valve 70 and depends therefrom so that upon axial movement of the reversing lever to a predetermined position the crank arm 90 is placed in position to contact with the dogs 92 which are fastened to the reciprocable grinding wheel head member 43. The dogs 92 are slidably mounted on the base member 93 and are equipped with suitable lock nut means 94 for fixing them in any desired position relative to the base member 93. The dogs 92 are adapted to engage the end of the depending crank arm 90 and rotate the rod 70 so as to cause the fork member 72a to contact one or the other of the collars 75 and shift the valve rod 68 so as to reverse the travel of the grinding wheel head mechanism. Engaging around the crank arm 90 is a U-shaped guide 96 having inner inclined cam surfaces 96a which are adapted to guide the arm 90 into the central flat portion 96b to lock the reversing lever 70 out of the path of the dogs 92 and bring the roller to rest on the high point of the cam surface 79a of the cam 79. In this position the member 76 rests in the V-shaped stop 77 and the hydraulic valve mechanism is in neutral or off position, as illustrated in Figure 3. This is indicated to the operator by means of the pointer 100 attached to the valve rod 68 adjacent the knob 69 and which is movable over the dial 101. In the position indicated at C on the dial, as shown in Figure 3, the grinding wheel cross feed valve 68 is set for manual operation. When the pointer 100 is set at position B the dogs 92 will not be contacted by the reversing arm lever 90 so that the mechanism accordingly must be manually reversed. Upon movement of the pointer to position A, the mechanism is set for full automatic reversing operation and in this position the grinding wheel head members will be reversed automatically by the dogs 92 which alternately strike the end of the member 90 to actuate the valve reversing lever 70.

As shown in Figure 1, the coolant or grinding wheel composition is supplied to each grinding wheel member through the hose 105 and is delivered onto the work surface through the nozzle 106. A hand valve 107 is provided for adjusting the amount of coolant used. The coolant is circulated by a fluid pump, not shown, and the impeller of the pump is preferably submerged in the coolant so that the unit is self-priming.

*Elevating and lowering mechanism for the grinding wheel head members*

The mechanism for vertically reciprocating the grinding wheel assemblage comprises the vertical screw shaft members generally designated 110 which are suitably journaled on either side of the frame structure 20, as illustrated in Figure 2. The vertical screw shaft members 110 are arranged to be operated from a central position by the operator, as shown in Figures 1 and 2; actuation of the screw on the right side of the table from the operator being effected through the transverse shaft 112 and bevel gearing 113. Hand wheel members generally designated 115 are operatively connected through the clutch 116 to the shaft 117 and bevel gearing to rotate the vertical screw shafts 110. The hand wheels 115 are equipped with suitable handles 118 for use in manually rotating the wheels. Each of the screw shafts is operable independently so as to position the grinding wheel members in any desired position along the vertical axis of the screw shafts. The clutch and associated mechanism is housed in the casing 119.

Figure 6:
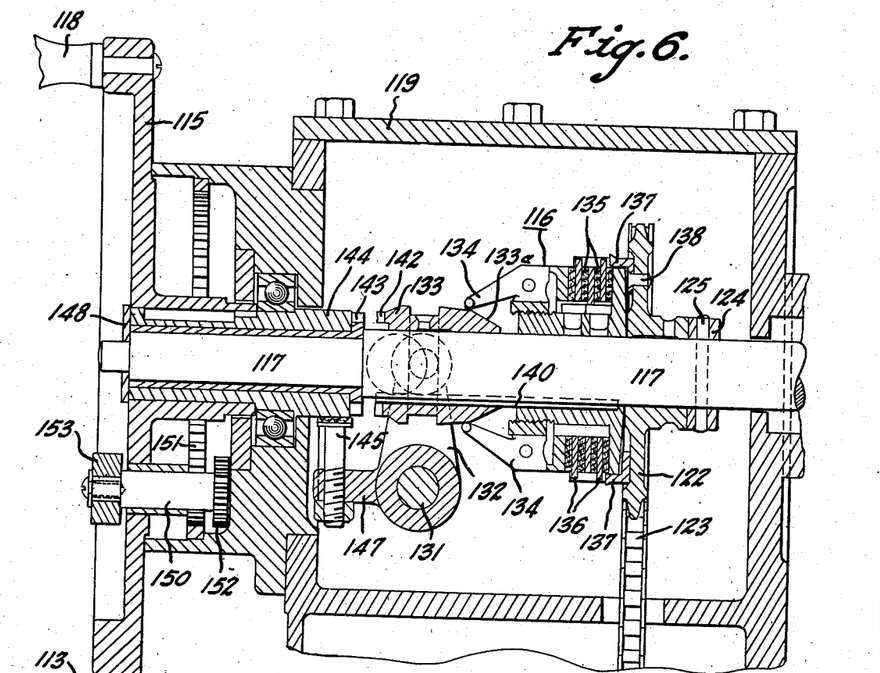
Figure 6 is an enlarged vertical sectional view taken through one of the combined manual and electrically operated grinding wheel head elevating and lowering mechanisms showing the clutch and associated operating parts.
Figures 7, 8:
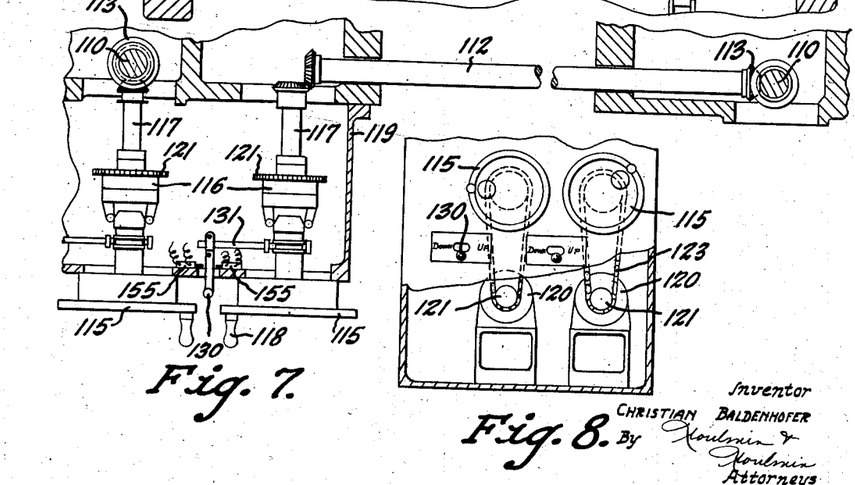
Figure 7 is a fragmentary sectional plan view of the grinding wheel elevating and lowering mechanism showing the arrangement of the electrical switch and clutch control means.
Figure 8 is a fragmentary elevation view, partly broken away, illustrating the motor driving connections and operating control means.

As shown in Figure 8, the screw members 110 may be independently operated automatically by reversible driving motor means 120 which is suitably positioned in the base of the housing 119. A driving connection is made to the shaft 117 through the motor sprocket 121 and the sprocket 122 by means of a connecting chain 123. The sprocket 122 is mounted so as to rotate on the shaft 117 and is positioned by means of the collar 124 which is retained on the shaft 117 by the pin 125. If desired the clutch means 116 may be omitted from the construction and the sprocket 122 keyed to the shaft 117. For controlling the direction of rotation of the screw members so as to move the grinding wheel head mechanism up or down there is provided a control lever 130 which is operably connected to the clutch lever 131 for engaging the clutch 116 so that the vertical screw shafts can be electrically motor driven. When the lever 130 is moved upward from its position, as shown in Figure 8, the clutch operating lever 131 is rotated reciprocating the fork lever 132 sliding the attached collar 133 to the right to throw the clutch mechanism in engagement, as shown in Figure 6. This is accomplished by engagement of the cam surface portion 133a on the collar 133 with the pivoted lever members 134 which in turn squeeze the friction clutch plates 135 in driving engagement with the driven plate members 136 which are rotated by the sprocket 122 and attached lateral extending members 137 which are suitably fastened thereto as at 138.

The collar 133 is keyed to the shaft 117, as at 140, and the collar is adapted to slide longitudinally of the shaft 117. On the forward end of the collar 133 there are provided teeth 142 which are adapted to engage with the teeth 143 on the rearward end of the stub shaft 144 of the hand wheel 115. A brake member 145 is arranged to be contacted with the inner hub of the shaft 144 of the hand wheel by the arm member 147 which is integral with the clutch shifting lever 132. In this way, when the hand wheel 115 is declutched from the member 133, rotation of the wheel 115 is prevented by the brake 145. The hand wheel 115 rotates freely on an extension of the shaft 117 and is suitably retained on the end thereof by the cap 148. A vernier hand control member 150 is provided for obtaining fine adjustments for vertically positioning the grinding wheels. This mechanism, as shown in Figure 6, comprises a fixed gear wheel 151 and an axially shiftable pinion gear 152.

A knob 153 is provided for grasping the outer end of the pinion gear shaft and moving the gear 152 in engagement with the teeth on the gear wheel 151 so as to move the hand wheel 115 as required. When not in use the vernier hand control means is shifted inward so as to disengage the gear 152 from the gear 151 to permit free movement of the hand wheel 115. Motor drive means 120 which raises or lowers the grinding wheel mechanism on the shafts 110 is placed in operation by shifting the lever 130 to the right or left so as to close one or the other of the electric switches 155. The electrical switch members 155 are positioned at opposite sides of the clutch control lever 130, as shown in Figures 7 and 8, and are connected so that when the electrical connections are made through the control lever 130 and the switch on the right, the motor 120 rotates in one direction, and when made through the switch on the left, rotation is in the opposite direction.

*Wheel head support and vertically moving mechanism*

Figures 9, 10:
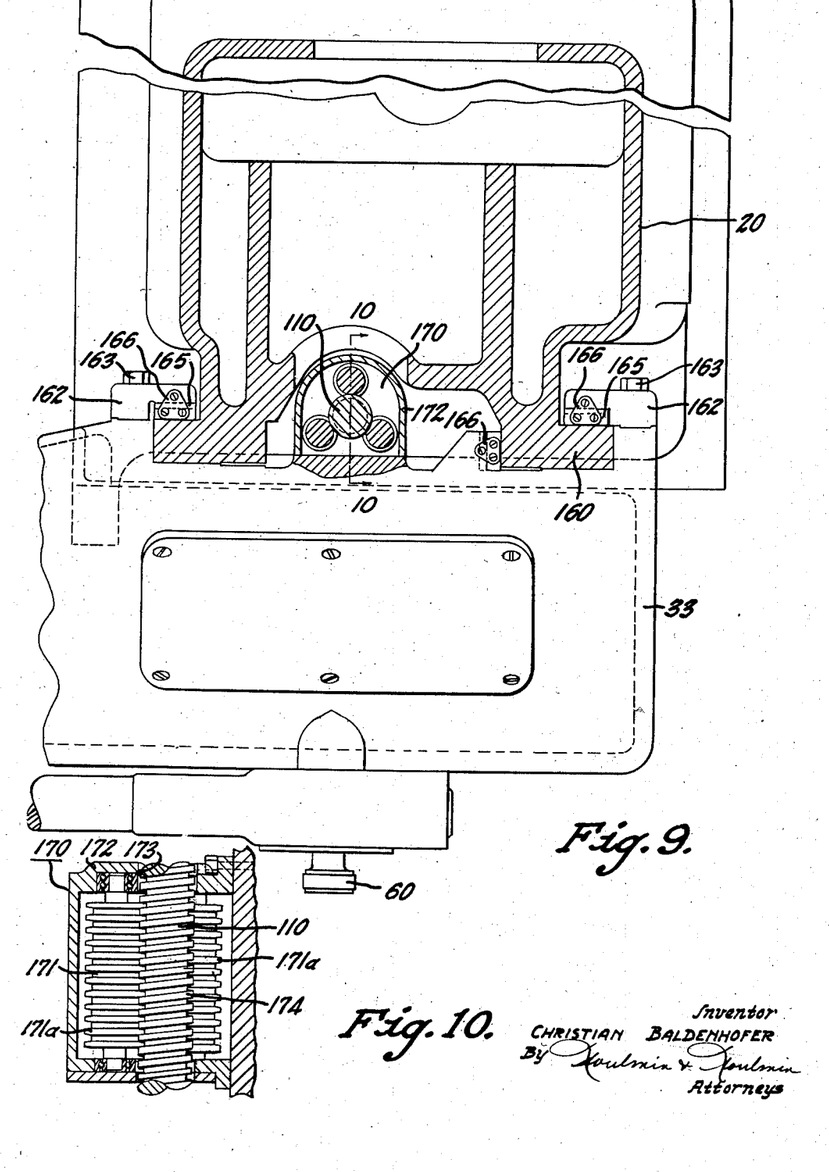
Figure 9 is a sectional view taken substantially along the line 9—9 of Figure 2, looking in the direction of the arrows.
Figure 10 is a fragmentary detail sectional view taken on the line 10—10 of Figure 9, showing the anti-friction roller member in engagement with the vertical screw drive shaft which is operable to raise and lower the grinding wheel head members.

The saddle-like grinding wheel head supporting members 33 are adapted to be moved up and down on the vertical screw members 110 while being slidably retained against the spaced vertical guide members 160. Guide members 160 are of L-shaped cross section, as shown in Figure 9, and are preferably formed integral with the frame structure 20. The rearward extending portion of the wheel head support members 33 fit around the guide members 160 and are secured thereto by means of the opposed inward extending bosses 162. These bosses are bolted to the wheel head body member as at 163, so as to interlock the grinding head member 33 with the flange portions of the guide members 160.

Tapered gibs 165 are positioned between the guide member 160 and wheel head support means, as illustrated in Figure 9. The gibs are retained in place by the attaching plate means 166, and the gibs are adjustable to permit the saddle to follow the screw downward by its own weight. The proper adjustment is determined by freeing the gibs and tightening one at a time until a slight binding action is noted when the gibs are lowered further. All the play is in this way eliminated, insuring accuracy in operating the grinding head mechanism.

For supporting the saddle 33 on the vertical screw member 110 there is employed an anti-friction nut generally designated 170 which comprises a plurality of separate roller members 171 having the threads 171a. The rollers 171 are suitably journaled in the housing 172 which is bolted to the rear structure of the saddle 33. The vertical screw member 110 is adapted to pass through the central opening 173 in the housing 172, and the threads 174 on the screw member 110 are adapted to engage with the threads 171a of the rollers and support the grinding wheel head saddle member 33. This construction materially reduces the friction in operating the screw member 110 and provides an improved mechanism for raising and lowering the grinding wheels and associated parts with ease.

Grinding wheel head construction

Figure 11:
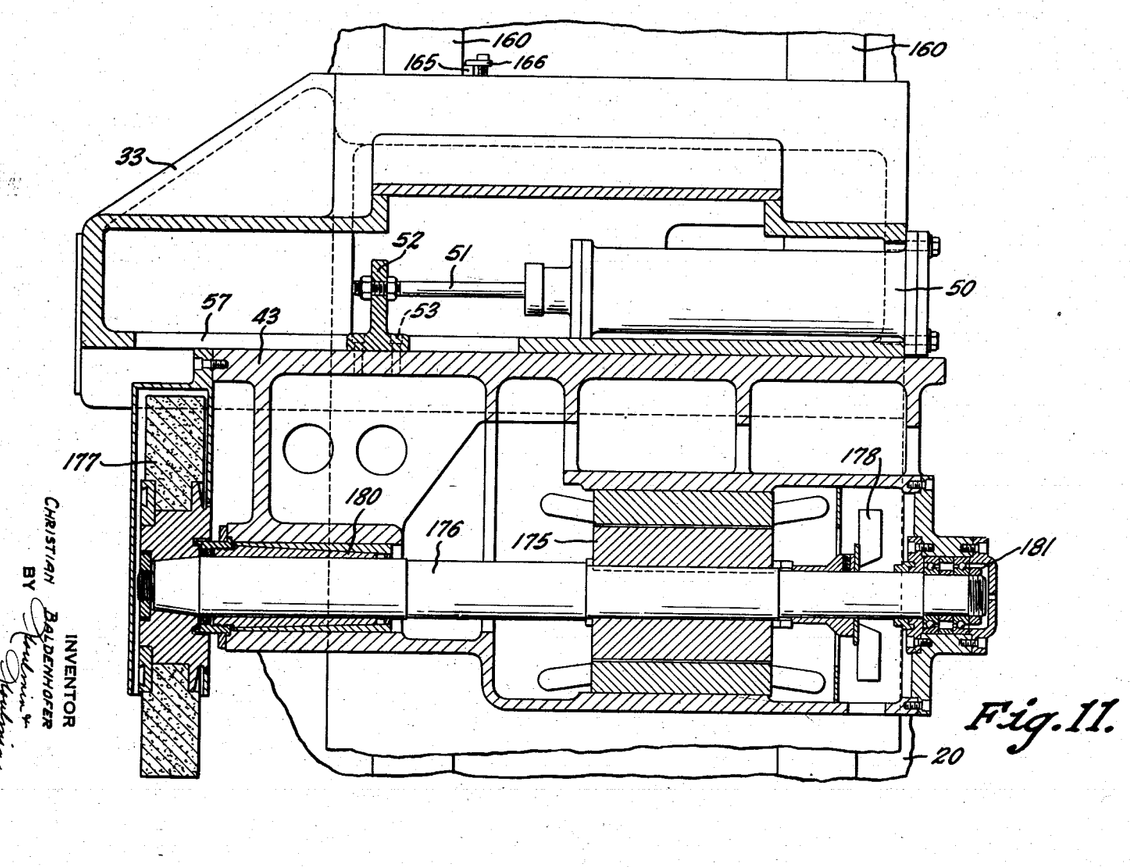
Figure 11 is a sectional view taken through one of the grinding wheel head members and associated reciprocating means.

The grinding wheel head is constructed, as shown in Figure 11, with a motor 175 positioned on the spindle 176. The grinding wheel member generally designated 177 is suitably mounted on the outer end of the spindle or axle 176 and rotates when the spindle 176 is driven by the motor. Grinding wheels which have been dynamically and statically balanced are preferably used. Ventilation of the motor parts is provided for by a fan 178 which is mounted on a spindle at the rear of the motor, as illustrated in Figure 11. During operation air is drawn into the head through the openings in the front end of the grinding head mechanism and is expelled radially through the openings provided in the head casing.

The front bearing 180 is preferably made of a bronze sleeve or equivalent bearing metal while the rear bearing 181 is of the ball bearing type. The whole wheel head and motor is reciprocated as a unit by the hydraulic piston cylinder generally designated 50, which is mounted in the saddle or grinding wheel head mechanism 33, as illustrated in Figure 11.

Figure 12:
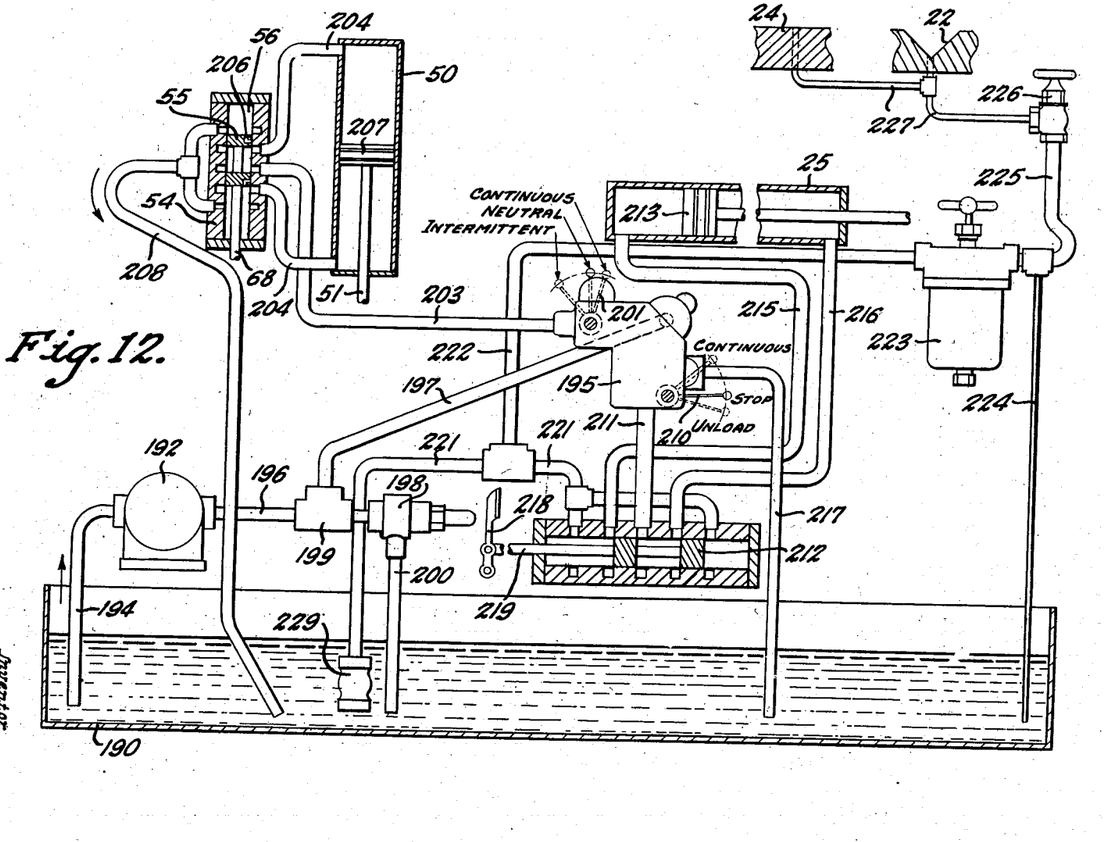
Figure 12 is a diagrammatic view, partly in section, of the hydraulic system and associated mechanism for controlling the movement of the table and grinding wheel head members.

Hydraulic system for reciprocating the table feed and grinding wheel cross-feed mechanism For controlling the reciprocation of the work table and grinding wheel cross-feed movement a hydraulic piping system, diagrammatically illustrated in Figure 12, is utilized. This system comprises a hydraulic fluid, preferably lubricating oil, which is stored in the supply tank 190. This tank is preferably cast integral with the base 15 and is accessible through the power unit openings or door members 191. A pump 192 is arranged to draw hydraulic fluid from the tank 190 through the suction line 194 and force it outward to the master fluid throttle valve 195 by way of the pipe connections 196 and 197. A relief valve 198 is set to release fluid when a predetermined pressure is exceeded and is in communication with the fluid pressure line 196 by way of the T-pipe connection 199. Fluid released by the relief valve is returned to the tank by way of the conduit 200.

The master valve 195 comprises the grinding wheel head control lever 201 which is arranged to be off when in vertical position. By moving the lever 201 to the right a continuous movement of the cross-head grinding wheel mechanism is obtained, which speed of movement is increased as the lever is moved farther to the right. When the lever is moved to the left an intermittent cross-feed is obtained, while the table is in operation, which increases in width of feed as the lever is moved farther to the left. Hydraulic fluid is admitted to the grinding head cross-feed cylinder 50 through the pipes 203 which are in communication with the four-way valve member 54. Passage of the fluid to and from the cylinder 50 by way of the conduits 204 is controlled by the position of the piston valve member 55, as illustrated in Figure 12. Ports 206 in the piston walls permit discharge of the fluid from either side of the piston or ram member 207 for moving the grinding wheels laterally manually when the hydraulic feeding mechanism is in neutral or off position. A common discharge line 208 is connected to the valve chamber 54 to return the used fluid back to the tank 190.

The table control valve lever is connected to the master valve as at 210. By raising the lever 210, fluid is admitted through the pipe 211 through the piston valve 212 to the cylinder 25 to move the table when the piston valve 212 is set to admit fluid thereto. Fluid is admitted to and returned from the cylinder 25 at one side or the other of the piston 213 by way of the conduits 215 and 216. When the lever 210 is in the horizontal position, movement of the table is stopped and upon further downward movement of the lever the fluid is unloaded from the valve through the pipe 217 and returned to the storage tank 190.

The table reversing lever 218 is connected to the piston valve 212 by the rod 219, as shown in Figure 12, and is actuated to reverse the directional travel of the table 16 by reversing the flow of fluid to the table operating cylinder 25. When the lever 218 is moved to the left the table moves to the right and vice versa. Movement of the table may be reversed at any time by swinging the lever 218 in the opposite direction. The table dogs 220 are provided for automatically actuating the lever 218 so as to reverse the movement of the table at the proper time. In the main fluid exhaust line 221 there is connected a low pressure fluid line 222 which communicates with the filter 223 and return fluid conduit 224. The filter is preferably semi-automatic and of the continuous cleaning type. Controlled amounts of lubricant pass from the filter through the pipe connection 225, needle valve 226 and conduits 227 to the table support V-way 22 and flatway 24 to lubricate the same during operation of the machine.

The foot valve 229 in the discharge line 221 is provided to regulate the rate of discharge of the hydraulic fluid so as to produce sufficient flow of oil through the low pressure line 222. Electric control button switches 230 are suitably positioned adjacent the control levers, as shown in Figure 1, and are connected electrically to the grinding wheel motors and hydraulic fluid pump means.

*General operation*

In operating the machine it will be understood that the work feed table and attached work piece member 17 will be hydraulically reciprocated beneath the grinding wheel members 177. The grinding wheels are vertically positioned to contact the work piece surface which it is desired to grind.

Reciprocation of the table 16 is started, when the hydraulic fluid system is in operation by moving the control lever 218 so as to admit fluid under pressure to the cylinder 25. The dogs 220 which move with the table are set to engage the lever at the proper time to reverse the movement of the piston 213 so as to reciprocate the table back and forth. Lateral movement of the grinding wheels 177 is then set for automatic or manual operation by setting the control means 69 and dogs 92 as described above. The speed of movement of the table is controlled by the lever 210 and the grinding wheel head hydraulic cross-feed speed is controlled in like manner by the lever 201. The feed is carefully adjusted so as to prevent wheel grain marks during grinding. Different types and sizes of grinding wheels may be used. Further, it will be understood that use may be made of a magnetic chuck when grinding ferrous work if desired.

It will be further understood that this invention is not limited to the specific details of construction shown and that I desire to comprehend within my invention such modifications as may be necessary to adapt it to varying conditions and uses.

Having thus fully described my invention, what I claim as new and desire to secure by Letters Patent is:

1. In a multiway grinding machine, the combination of a bed for positioning work to be ground, means for moving said work on said bed, a frame structure associated with said bed comprising supporting uprights and rigid bracing means rigidly connecting the top of said uprights above said bed and the work being ground, means comprising a grinding wheel, driving and adjusting mechanism adjustable and independently mounted on each one of said vertical supports, whereby the load of said grinding wheel mechanism is carried independently on each of said supports while the means connecting the top of said support and the bottom thereof insures a predetermined position between said grinding wheel mechanism.

2. In a multiway grinding machine, the combination of a bed for positioning work to be ground, means for moving said work on said bed, a frame structure associated with said bed comprising supporting uprights and rigid bracing means rigidly connecting the top of said uprights above said bed and the work being ground, means comprising a grinding wheel, driving and adjusting mechanism adjustable and independently mounted on each one of said vertical supports, whereby the load of said grinding wheel mechanism is carried independently on each of said supports while the means connecting the top of said support and the bottom thereof insures a predetermined position between said grinding wheel mechanism, and means for rigidly and immovably connecting said uprights to said bed adjacent one of their ends at the other of their ends, to thereby form a rigid parallelogram with said grinding wheels facing each other, the axes of said grinding wheels being substantially in line with each other.

3. In a multiway grinding machine, the combination of a bed for positioning work to be ground, means for moving said work on said bed, a frame structure associated with said bed comprising supporting uprights and rigid bracing means rigidly connecting the top of said uprights above said bed and the work being ground, means comprising a grinding wheel, driving and adjusting mechanism adjustable and independently mounted on each one of said vertical supports, whereby the load of said grinding wheel mechanism is carried independently on each of said supports while the means connecting the top of said support and the bottom thereof insures a predetermined position between said grinding wheel mechanism, and means for rigidly and immovably connecting said uprights to said bed adjacent one of their ends at the other of their ends, to thereby form a rigid parallelogram with said grinding wheels facing each other the axes of said grinding wheels being substantially in line with each other, said adjusting mechanism having means for adjusting said grinding wheels in parallel vertical planes toward and away from said work.

4. In a multiway grinding machine, the combination of a bed for positioning work to be ground, means for moving said work on said bed, a frame structure associated with said bed comprising supporting uprights and rigid bracing means rigidly connecting the top of said uprights above said bed and the work being ground, means comprising a grinding wheel, driving and adjusting mechanism adjustable and independently mounted on each one of said vertical supports, whereby the load of said grinding wheel mechanism is carried independently on each of said supports while the means connecting the top of said support and the bottom thereof insures a predetermined position between said grinding wheel mechanism, and means for rigidly and immovably connecting said uprights to said bed adjacent one of their ends at the other of their ends, to thereby form a rigid parallelogram with said grinding wheels facing each other, the axes of said grinding wheels being substantially in line with each other, said adjusting mechanism having means for adjusting said grinding wheels in parallel vertical planes toward and away from said work, said last named means including vertically mounted screw shaft members to thereby move said grinding wheels in said vertical planes.

5. In a multiway grinding machine, the combination of a bed for positioning work to be ground, means for moving said work on said bed, a frame structure associated with said bed comprising supporting uprights and rigid bracing means rigidly connecting the top of said uprights above said bed and the work being ground, each upright having a supporting crosshead, bearings mounted in each crosshead comprising a plain bearing and an adjustable bearing mounted on opposite sides of said crosshead, a shaft mounted in said bearings of each crosshead, a grinding wheel on one end of each shaft, a motor having its armature mounted on each of said shafts between said bearings and its stator mounted in the crosshead, means for adjusting each crosshead and its grinding wheel assembly in said uprights, whereby the entire load of each grinding wheel, its motor, and crosshead is supported by one of said uprights.

6. In a multiway grinding machine, the combination of a bed for positioning work to be ground, means for moving said work on said bed, a frame structure associated with said bed comprising supporting uprights and means connecting the top of said uprights above said bed and the work being ground, each upright having a supporting crosshead, bearings mounted in each crosshead comprising a plain bearing and an adjustable bearing mounted on opposite sides of said crosshead, a shaft mounted in said bearings of each crosshead, a grinding wheel on one end of each shaft, a motor having its armature mounted on each of said shafts between said bearings and its stator mounted in the crosshead, means for adjusting each crosshead and its grinding wheel assembly in said uprights, whereby the entire load of each grinding wheel, its motor, and crosshead is supported by one of said uprights, and means for moving said motors and grinding wheels in unison transversely of said work.

CHRISTIAN BALDENHOFER.